US009471394B2

(12) United States Patent
Perlegos et al.

(10) Patent No.: US 9,471,394 B2
(45) Date of Patent: Oct. 18, 2016

(54) FEEDBACK SYSTEM FOR OPTIMIZING THE ALLOCATION OF RESOURCES IN A DATA CENTER

(71) Applicant: Cloubrain, Inc., Fremont, CA (US)

(72) Inventors: Pete C. Perlegos, Fremont, CA (US); Ruben Zhao, Pleasanton, CA (US)

(73) Assignee: Cloubrain, Inc., Fremont, CA (US)

( * ) Notice: Subject to any disclaimer, the term of this patent is extended or adjusted under 35 U.S.C. 154(b) by 39 days.

(21) Appl. No.: 14/207,231

(22) Filed: Mar. 12, 2014

(65) Prior Publication Data

US 2014/0282541 A1  Sep. 18, 2014

Related U.S. Application Data

(60) Provisional application No. 61/779,656, filed on Mar. 13, 2013.

(51) Int. Cl.
*G06F 9/46* (2006.01)
*G06F 9/50* (2006.01)
*G06F 9/455* (2006.01)

(52) U.S. Cl.
CPC ......... *G06F 9/5083* (2013.01); *G06F 9/45558* (2013.01); *G06F 2009/4557* (2013.01); *G06F 2009/45562* (2013.01); *G06F 2009/45566* (2013.01); *G06F 2209/5019* (2013.01)

(58) Field of Classification Search
CPC ............. G06F 9/5083; G06F 9/45558; G06F 2009/4557; G06F 2209/5019; G06F 2009/45562; G06F 2009/45566
See application file for complete search history.

(56) References Cited

U.S. PATENT DOCUMENTS

| 2003/0149685 | A1  | 8/2003 | Trossman et al. |
| 2010/0250868 | A1* | 9/2010 | Oshins ............... G06F 12/0284 711/154 |
| 2011/0072138 | A1  | 3/2011 | Canturk et al. |
| 2011/0154327 | A1  | 6/2011 | Kozat et al. |
| 2012/0167083 | A1  | 6/2012 | Suit |
| 2012/0198447 | A1  | 8/2012 | Osogami et al. |
| 2013/0124712 | A1* | 5/2013 | Parker .......................... 709/224 |

OTHER PUBLICATIONS

PCT International Search Report and Written Opinion for PCT/US2014/024948, Jun. 27, 2014, 8 pages.

* cited by examiner

*Primary Examiner* — Camquy Truong
(74) *Attorney, Agent, or Firm* — Fenwick & West LLP

(57) ABSTRACT

To improve resource utilization and reduce the virtual machine sprawl in a data center, resource utilization is predicted based on previously measured utilizations, and then, using the predicted utilizations, optimizing the allocation of the computing resources among the virtual machines in the data center. In operation, measurements related to resource utilization by different virtual machines executing in a data center are collected at regular intervals. At each interval, an optimization system predicts virtual machine resource utilizations based on previously collected measurements and previously-generated virtual machine modelers. Based on the utilization predictions as well as the physical topology of the data center, the optimization system identifies different optimizations to the virtual machine topology for the next interval.

18 Claims, 3 Drawing Sheets

FEEDBACK SYSTEM FOR OPTIMIZING THE ALLOCATION OF RESOURCES IN A DATA CENTER

CROSS REFERENCE TO RELATED APPLICATIONS

This application claims the benefit of U.S. Provisional Application No. 61/779,656, filed Mar. 13, 2013, which is incorporated by reference in its entirety.

BACKGROUND

A data center is a centralized facility that stores, manages and serves data and applications pertaining to one or more businesses. To support this function, a data center houses many physical components including large scale computers. A computer system typically runs multiple virtual machines to maximize the use of the processing power of a computer system. Each virtual machine on a computer system operates independently from other virtual machines but utilizes the same underlying hardware of the computer system as the other virtual machines.

Data center administrators face many challenges when configuring the physical resources in the data center for optimal and cost-effective use. Specifically, physical resources need to be allocated in an optimized manner to increase the overall resource utilization. Optimizing the allocation of resources, however, is complex as the load on the resources is constantly changing. Similarly, virtual machines are often spawned on demand as the load increases but are not properly killed or migrated when the load decreases. This creates a virtual machine sprawl resulting in an uneven distribution of server utilization and server underuse.

SUMMARY

To improve resource utilization of computer resources and reduce the virtual machine sprawl in a data center, the behaviors of virtual machines executing in the data center collected in the past may be modeled to predict future behaviors. The virtual machine topology of a data center is then preemptively reconfigured based on the predicted behaviors. Preemptively reconfiguring the virtual machine topology reduces the over or under utilization of physical resources in the data center. More specifically, the data center, at any given time interval, is optimally configured for the subsequent time interval and is therefore better equipped for the future behaviors of the virtual machines.

Embodiments of the invention predict resource utilization within the data center based on previously measured utilizations. The allocation of computing resources among the virtual machines in the data center is then optimized based on the predictions. In operation, measurements related to resource utilization by different virtual machines executing in a data center are collected at regular intervals. At each interval, an optimization system attempts to predict virtual machine resource utilizations based on previously collected measurements and previously-generated virtual machine modelers. Based on the utilization predictions as well as the physical topology of the data center, the optimization system identifies different optimizations to the virtual machine topology for the next interval. The optimization system instructs the data center to update the virtual machine topology based on the identified optimizations.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

To improve resource utilization of computer resources and reduce the virtual machine sprawl in a data center, embodiments of the invention predict resource utilization based on previously measured utilizations, and then, using the predicted utilizations, optimizing the allocation of the computing resources among the virtual machines in the data center. In operation, measurements related to resource utilization by different virtual machines executing in a data center are collected at regular intervals. At each interval, an optimization system attempts to predict virtual machine resource utilizations based on previously collected measurements and previously-generated virtual machine modelers. Based on the utilization predictions as well as the physical topology of the data center, the optimization system identifies different optimizations to the virtual machine topology for the next interval. The optimization system instructs the data center to update the VM topology based on the identified optimizations.

System Architecture

Figure 1:
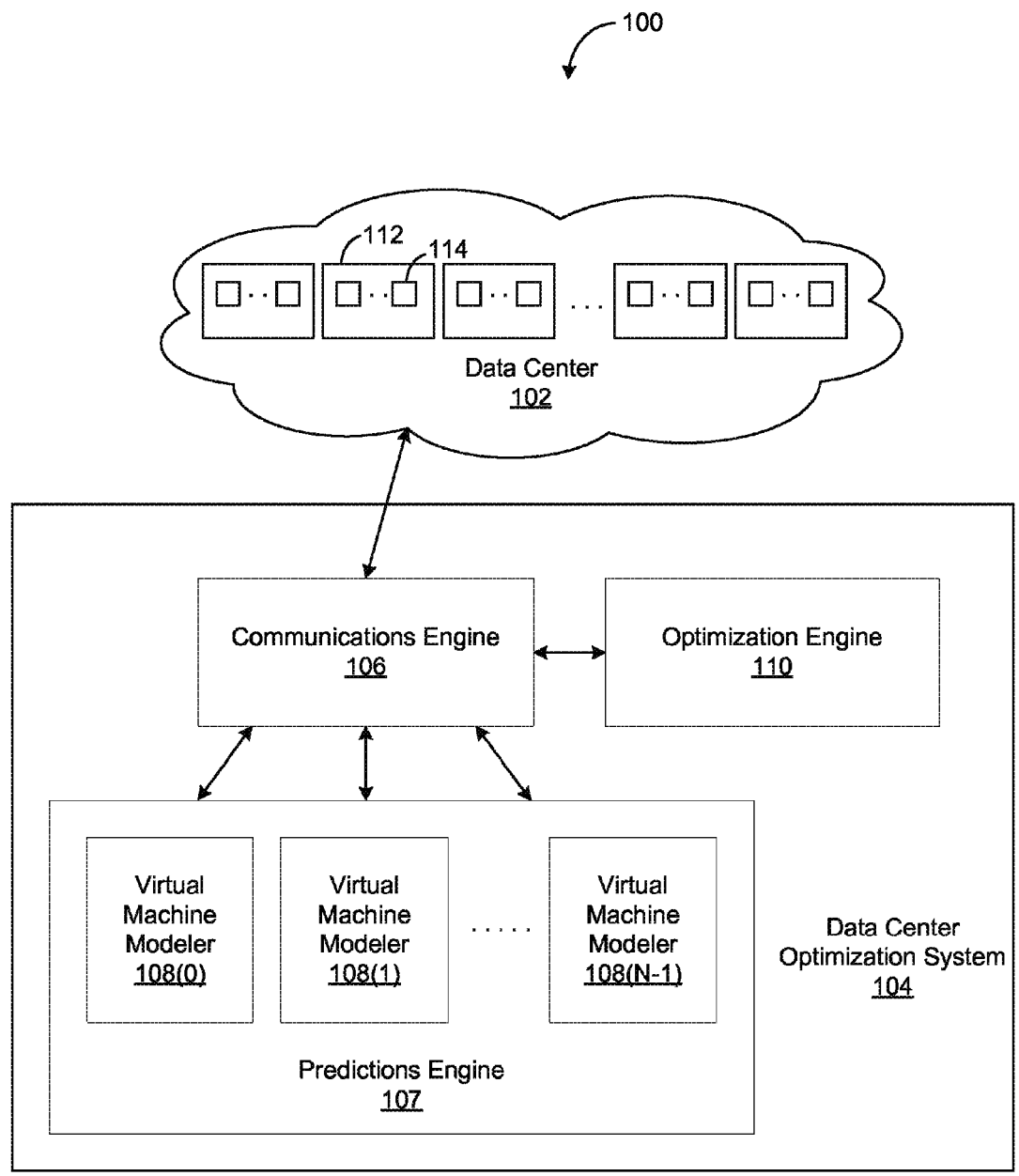
FIG. 1 illustrates a computing environment for optimizing the virtual machine topology in a data center, according to one embodiment of the invention.

FIG. 1 illustrates a computing environment 100 for optimizing the virtual machine topology in a data center, according to one embodiment of the invention. As shown, the computing environment 100 includes a data center 102 and a data center optimization system 104.

The data center 102 is a facility that houses multiple physical machines, such as physical machine 112, and other associated components (not shown) including telecommunications and storage systems, power distribution and management systems, environmental controls (e.g., air conditioning, fire suppression) and security devices. Each physical machine in the data center executes one or more virtual machines (VMs), such as VM 114 executing in physical machine 112. The VMs execute applications that the data center 102 services. To execute the applications, the VMs consume resources, such as processing power and memory, provided by the physical machines in the data center 102.

The data center 102 is associated with a physical topology and a VM topology. The physical topology specifies the physical location of each of the physical machines within the data center 102. The physical machines may be housed in racks, such that multiple physical machines may be housed in the same rack. The physical machine topology associated with the data center 102 is largely fixed and is modified only when the physical layout of the data center 102 changes. The VM topology specifies, at a given point in time, the different VM executing on each physical machine of the data center 102. VMs are spawned and killed as necessary and may be migrated from one physical machine to another based on various factors. Therefore, the VM topology associated with the data center 102 is not fixed and changes as VMs are spawned, killed or migrated.

The data center 102 regularly collects various measurements related to the operation of the data center 102 as a whole and the operation of each physical machine and each VM executing within the physical machines. For the data center as a whole, such measurements include, but are not limited to, power utilization and temperature. For a physical machine, such measurements include, but are not limited to, power usage, temperature, processor usage, and network usage. For a specific VM, such measurements include, but are not limited to, processor usage, network usage and input/output device usage.

The data center optimization system 104 operates in conjunction with the data center 102 to optimize the VM topology for efficient utilization of the resources provided by the data center 102 and a reduction of VM sprawl within the data center 102. The data center optimization system 104 includes a communications engine 106, a predictions engine 107 and an optimization engine 110. The communications engine 106 co-ordinates the transmission of data between the data center 102 and the data center optimization system 104. In operation, the communications engine 106 accesses, at regular intervals, the measurements collected by the data center 102 via an application programming interface (API) exposed by the data center 102. The communications engine 106 transmits the measurements to the predictions engine 107 for further processing.

The predictions engine 107 processes the measurements to generate a different set of tuples for every VM executing in the data center 102. Each tuple in the set of tuples for a particular VM includes a series of measurements associated with a given resource used by that VM. The series of measurements include one or more previous measurements and the most recent measurement captured by the data center 102. The number of measurements reflected in a given tuple, i.e., the length of the tuple, is configurable based on processing power available to the predictions engine 107 and the number of measurements needed for accurate future predictions.

As an example, assume the predictions engine 107 receives, at regular intervals, measurements related to memory and processor usage related to two VMs, VM A and VM B. At a given time interval T, the predictions engine 107 has the following measurements for VM A and VM B, where measurements for T-3, T-2 and T-1 were received previously:

|  | Interval T-3 | Interval T-2 | Interval T-1 | Interval T |
|---|---|---|---|---|
| VM A Measurements |  |  |  |  |
| Memory | 35 | 33 | 30 | 22 |
| Processor | 55 | 57 | 48 | 45 |
| VM B Measurements |  |  |  |  |
| Memory | 10 | 16 | 40 | 40 |
| Processor | 25 | 25 | 55 | 50 |

Based on the above measurements, the predictions engine 107 generates a set of tuples for VM A and a set of tuples for VM B, where each tuple represents measurements of a different resource usage. The set of tuples for VM A may be of the form: [35, 33, 30, 22]; [55, 57, 48, 45] and the set of tuples for VM B may be of the form: [10, 16, 40, 40]; [25, 25, 55, 50].

In one embodiment, the predictions engine 107 generates the tuples to indicate the change in measurements over time instead of the absolute magnitude. In such an embodiment, the earliest measurement of a particular resource usage is specified in a tuple as an absolute magnitude and the subsequent measurements are specified as a series of deltas. Continuing the example above, the set of tuples for VM A, in such an embodiment, would take the form: [35, −2, −3, −8]; [55, 2, −9, −3] and the set of tuples for VM B would take the form: [10, 6, 24, 0]; [25, 0, 30, −5].

The predictions engine 107 feeds the generated sets of tuples to the virtual machine modelers 108 for generating predictions of future resource utilizations. For a given set of tuples associated with a VM, the predictions engine 107 causes a VM modeler 108 to process the tuples to generate a prediction for the VM's usage of a particular resource at the next time interval. For example, the predictions engine 107 may input the set of tuples for VM A, i.e., [35, −2, −3, −8]; [55, 2, −9, −3], into VM modeler 108(0) to generate a prediction for a memory resource usage at the next time interval. The predictions engine 107 may cause different VM modelers 108 to process the same set of tuples to predict the associated VM's usage of different resources at the next time interval. The manner in which a VM modeler 108 processes a set of tuples to generate a prediction regarding a particular resource is described in greater detail below in conjunction with FIG. 2.

In response to measurements received at a given time interval, the predictions engine 107 transmits per-VM predictions to the communications engine 106. Per-VM predictions for a particular VM specify predictions for the VM's utilization of different resources at the next time interval. The communications engine 106 transmits the per-VM predictions, the current virtual machine topology, the physical topology and the data center measurements received from the data center 102 to the optimization engine 110. The optimization engine 110 analyzes the per-VM predictions to identify any optimizations that need to be made to the VM topology for efficient use of data center resources.

In operation, the optimization engine 110 analyzes the per-VM predictions to identify a VM topology that most efficiently uses the physical machines available in the data center 102. Specifically, the optimization engine 110 attempts to assign each physical machine one or more VMs according to two policy constraints: (1) the maximal use of the resources, e.g., memory, network, and processing power, provided by the physical machine; and (2) the overall reduction of the VM sprawl across the different physical machines. In one embodiment, the optimization engine 110 utilizes a greedy sort algorithm to assign the VMs to the different physical machines. In an alternate embodiment, the optimization engine 110 utilizes a "next fit" algorithm that analyzes the predictions for each VM and identifies the best physical machine that should execute that VM based upon the resource available on the physical machine.

The optimization engine 110 may also optimize the VM topology by proximally locating VMs that are likely to communicate in subsequent time intervals. Proximally locating two VMs may result in the VMs being executed by the same physical machine or by physical machines in the same rack in the data center 102. In one embodiment, determining which VMs are likely to communicate with one another and when such communications will occur is predictable. In such an embodiment, proximally locating the VMs speeds up the communications between the VMs. In another embodiment, determining which VMs are to communicate is predictable but determining the frequency or the time of such communications is not predictable. In such an embodiment, the optimization engine 110 may cause the VMs to be proximally located in the next time interval to speed up any communications between the VMs that may occur. Depending upon the urgency of the migration from the prediction, the optimization engine 110 may instead stall on proximally locating the VMs to reduce the number of VM migrations in the next time interval and delay such migrations to future time intervals.

The optimization engine 110 may further optimize the VM topology based on heat and power usage measurements received from the data center 102. For example, the optimization engine 110 may reassign VMs from physical machines that are located in a high heat density area in the data center 102 to physical machines a lower heat density area. Power density optimization can be combined with resource optimization. In one embodiment, the power optimization can be combined with communication density usage or prediction, e.g. by shutting down a greater proportion of physical machines in a high heat density area of the data center and placing VMs with high network requirements on the remaining physical machines (machines that have not been shut down) in that region of the data center 102.

The optimization engine 110 transmits the optimized VM topology to the communications engine 106. The communications engine 106 analyzes the optimized VM topology to identify the differences between the current VM topology and the optimized VM topology. For each change in the topology, the communications engine 106 issues at least one command, via the API provided by the data center 102, for effectuating that change in the data center 102. Commands include migrating a VM executing on one physical machine to a different physical machine or shutting down unused physical machines. In one embodiment, no commands are issued if VM migrations are not needed, for example, when the resource benefit of the migration does not exceed the resource cost to migrate.

In certain embodiments, the data center optimization system 104 includes multiple instances of predictions engine 107 and optimization engine 110. The various instances take advantage of multi-core, multi-processor and/or multi-machine processing infrastructures. In such embodiments, a predictions engine 107 executes as an independent process and runs in parallel with other instances predictions engine 107. The VM modelers 108 included in the predictions engine 107 run in series or in parallel.

VM Modeler

Figure 2:
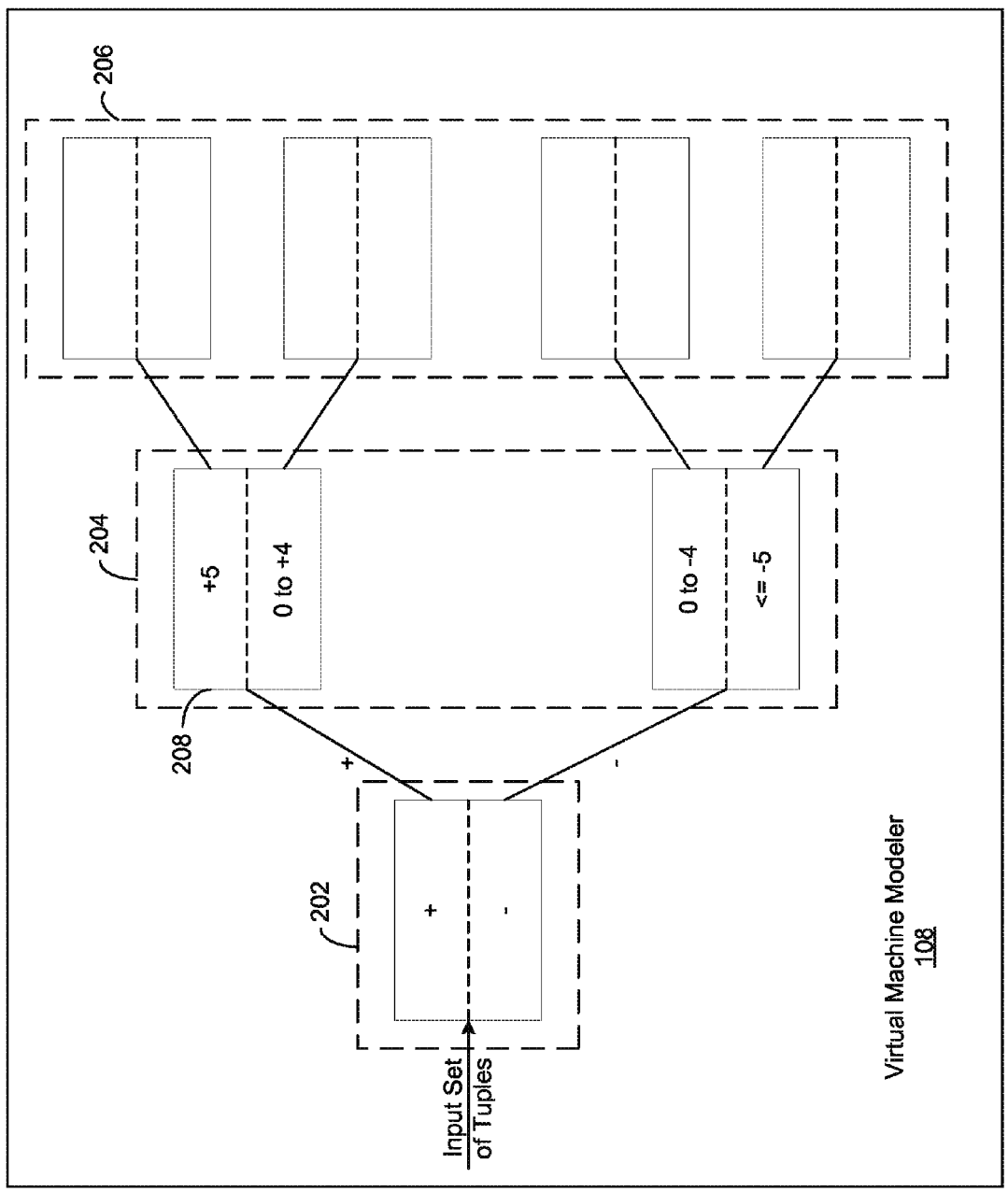
FIG. 2 illustrates a detailed diagram of a virtual machine modeler of FIG. 1, according to one embodiment of the invention.

FIG. 2 illustrates a detailed diagram of a VM modeler 108 of FIG. 1, according to one embodiment of the invention. The VM modeler 108 includes a binary tree having multiple stages, such as stage 202, stage 204, stage 206. Each stage of the binary tree is configured with one or more support vector machines (SVMs), such as SVM 204. Each SVM is configured with a set of ranges, each range being associated with a particular type of data, such as memory use, processing power use, etc.

In operation, training tuples with results of their next time intervals associated with a VM is input into the first stage of the VM modeler 108. The VM modeler 108 traverses the tree by training these tuples into + and − classifications in SVM 202. From this, the tuples follow their classifications to train the next level and so on. At runtime, the current tuple is taken into the SVM and classified to + or −. It then follows that branch down and reclassifies accordingly until its final classification is obtained. The VM modeler 108 will return the prediction for the current tuple using the previously generated model rapidly and then in the background, accept new training data to retain an updated model for later iterations.

The ranges configured in an SVM may be modified based on the actual measurements received from the data center 102 as well as the predictions made by the VM modelers 108. The number of stages in the binary tree of a VM modeler is also configurable based on the accuracy of the predictions made. Further, the lengths of the tuples being input into the VM modelers 108 are configurable based on the accuracy of the predictions. In one embodiment, the VM modelers 108 experiment with different lengths of the tuples until the length that yields the most accurate predictions with a computing cost below a pre-determined threshold is identified.

In alternative embodiments, instead of SVMs, the VM modeler 108 may use hidden Markov models (HMMs), naïve Bayes classifiers or ensemble methods to generate predictions regarding a particular resource.

VM Topology Optimization Method

Figure 3:
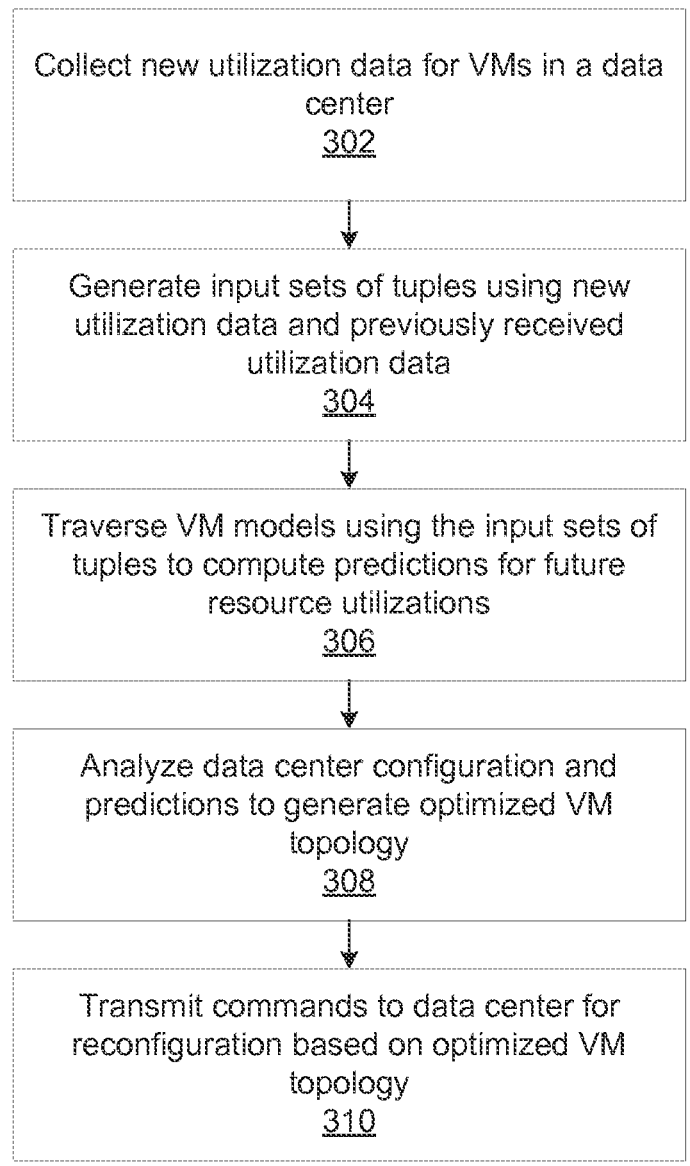
FIG. 3 is a flow diagram of method steps for optimizing the virtual machine topology of a data center, according to one embodiment of the invention.

FIG. 3 is a flow diagram of method steps for optimizing the VM topology of a data center, according to one embodiment of the invention. At step 302, the communications engine 106, at a given time interval, collects measurements related to resource utilization of VMs in the data center as well as other general data center measurements.

At step 304, the predictions engine 107 processes the measurements collected by the communications engine to generate a different set of tuples for every VM executing in the data center 102. Each tuple in the set of tuples for a particular VM includes a series of measurements related to a given resource used by that VM. At step 306, the predictions engine 107 feeds each of the sets of tuples to the VM modelers 108 for generating predictions of future resource utilizations for each VM. As discussed above, the VM modelers may employ SVMs, HMMs, naïve Bayes models or ensemble methods to predict resource utilizations. The predictions are transmitted to the optimization engine 110 for further processing. In addition, the predictions are analyzed within the predictions engine 107 to modify the SVMs within the various VM modelers 108 to make more accurate predictions in the future.

At step 308, the optimization engine 110 analyzes the predictions to identify any optimizations that need to be made to the VM topology for efficient use of data center resources. Once the optimizations are identified by the optimization engine 110, the communications engine 106 transmits commands to the data center to effectuate the VM topology changes reflective of the optimizations.

Alternate Embodiments

In an alternate embodiment, the optimization engine 110 operates on new measurements received from the data center to generate VM topology optimizations without relying on future utilization levels predicted by the prediction engine 107.

In another alternate embodiment, the VM modeler 108 will return the prediction for the current tuple using the previously generated model rapidly and then in the background, accept new training data to retain an updated model for later iterations.

In another alternate embodiment, the predictions engine 107 predicts resource utilization by VMs in the data center 102 for time intervals other than the directly next time interval. The predictions engine 107, using the VM modelers 108, may predict resource utilization several time intervals from the current time.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon.

What is claimed is:

1. A computer implemented method for optimizing a virtual machine topology of a data center, the method comprising:
   determining a virtual machine topology of the data center that indicates, for each of a plurality of virtual machines in the data center, a physical resource in the data center on which the virtual machine executes;
   collecting utilization data associated with the plurality of virtual machines and captured at a first time interval, the utilization data indicating utilization levels of different physical resources in the data center by the plurality of virtual machines;
   for each of the plurality of virtual machines, analyzing the utilization data to predict a future utilization level of at least one of the physical resources by the virtual machine;
   for each of the plurality of virtual machines, generating one or more optimizations to the virtual machine topology of the data center by determining an assignment of the virtual machine to a physical machine in the data center based on the predicted future utilization levels for the plurality of virtual machines, the assignments are determined based on a first policy constraint of maximally using resources provided by the plurality of physical machines and a second policy constraint of reducing a number of physical machines necessary to execute the plurality of physical machines; and
   transmitting one or more commands to the data center for reconfiguring the virtual machine topology according to the one or more optimizations.

2. The method of claim 1, wherein, for a first virtual machine, analyzing the utilization data comprises:
   identifying a subset of the utilization data that is associated with the first virtual machine;
   combining the subset of the utilization data with previously-collected utilization data associated with the first virtual machine; and
   predicting the future utilization level of a first resource by the first virtual machine based on the combined utilization data.

3. The method of claim 2, wherein combining the subset of the utilization data with the previously-collected utilization data comprises generating from the utilization data and the previously-collected utilization data a tuple having a plurality of entries, each entry corresponding to a utilization level of the first resource by the first virtual machine at a different time interval.

4. The method of claim 3, wherein a first entry in the tuple corresponds to a first time interval and specifies a utilization level of the first resource by the first virtual machine at the first time interval, and a second entry in the tuple corresponds to a second time interval directly subsequent to the first time interval and specifies a difference between the utilization level specified by the first entry and a utilization level of the first resource by the first virtual machine at the second time interval.

5. The method of claim 2, wherein predicting the future utilization level comprises providing the combined utilization data to a virtual machine modeler, the virtual machine modeler trained with historic utilization levels of a resource having a same type as the first resource and configured to predict the future utilization level based on the historic utilization levels.

6. The method of claim 1, wherein collecting the utilization data comprises accessing the utilization data via an application program interface provided by the data center.

7. The method of claim 1, further comprising:
determining that a first virtual machine is predicted to communicate with a second virtual machine in a future time interval, and wherein generating the one or more optimizations comprises assigning the first virtual machine and the second virtual machine to a first physical machine in the data center.

8. The method of claim 1, further comprising:
collecting heat density information from the data center, the heat density information indicating that a first physical machine is located in a high heat density area in the data center and a second physical machine is located in a low heat density area in the data center, and wherein generating the one or more optimizations comprises assigning a first virtual machine executing on the first physical machine to the second physical machine.

9. The method of claim 1, wherein analyzing the utilization data comprises predicting a future utilization level of at least one of the physical resources by the virtual machine in a next time interval subsequent to the first time interval, and transmitting the one or more commands comprises automatically causing the reconfiguring the virtual machine topology according to the one or more optimizations prior to the next time interval.

10. A non-transitory computer program product for optimizing a virtual machine topology of a data center, the computer program product comprising a computer-readable storage medium containing computer program code for:
determining a virtual machine topology of the data center that indicates, for each of a plurality of virtual machines in the data center, a physical resource in the data center on which the virtual machine executes;
collecting utilization data associated with the plurality of virtual machines and captured at a first time interval, the utilization data indicating utilization levels of different physical resources in the data center by the plurality of virtual machines;
for each of the plurality of virtual machines, analyzing the utilization data to predict a future utilization level of at least one of the physical resources by the virtual machine;
for each of the plurality of virtual machines, generating one or more optimizations to the virtual machine topology of the data center by determining an assignment of the virtual machine to a physical machine in the data center based on the predicted future utilization levels for the plurality of virtual machines, the assignments are determined based on a first policy constraint of maximally using resources provided by the plurality of physical machines and a second policy constraint of reducing a number of physical machines necessary to execute the plurality of physical machines; and
transmitting one or more commands to the data center for reconfiguring the virtual machine topology according to the one or more optimizations.

11. The non-transitory computer program product of claim 10, wherein, for a first virtual machine, analyzing the utilization data comprises:
identifying a subset of the utilization data that is associated with the first virtual machine;
combining the subset of the utilization data with previously-collected utilization data associated with the first virtual machine; and
predicting the future utilization level of a first resource by the first virtual machine based on the combined utilization data.

12. The non-transitory computer program product of claim 11, wherein combining the subset of the utilization data with the previously-collected utilization data comprises generating from the utilization data and the previously-collected utilization data a tuple having a plurality of entries, each entry corresponding to a utilization level of the first resource by the first virtual machine at a different time interval.

13. The non-transitory computer program product of claim 12, wherein a first entry in the tuple corresponds to a first time interval and specifies a utilization level of the first resource by the first virtual machine at the first time interval, and a second entry in the tuple corresponds to a second time interval directly subsequent to the first time interval and specifies a difference between the utilization level specified by the first entry and a utilization level of the first resource by the first virtual machine at the second time interval.

14. The non-transitory computer program product of claim 11, wherein predicting the future utilization level comprises providing the combined utilization data to a virtual machine modeler, the virtual machine modeler trained with historic utilization levels of a resource having a same type as the first resource and configured to predict the future utilization level based on the historic utilization levels.

15. The non-transitory computer program product of claim 10, wherein collecting the utilization data comprises accessing the utilization data via an application program interface provided by the data center.

16. The non-transitory computer program product of claim 10, wherein the computer-readable storage medium further contains computer program code for:
determining that a first virtual machine is predicted to communicate with a second virtual machine in a future time interval, and wherein generating the one or more optimizations comprises assigning the first virtual machine and the second virtual machine to a first physical machine in the data center.

17. The non-transitory computer program product of claim 10, wherein the computer-readable storage medium further contains computer program code for:
collecting heat density information from the data center, the heat density information indicating that a first physical machine is located in a high heat density area in the data center and a second physical machine is located in a low heat density area in the data center, and wherein generating the one or more optimizations comprises assigning a first virtual machine executing on the first physical machine to the second physical machine.

18. The non-transitory computer program product of claim 10, wherein analyzing the utilization data comprises predicting a future utilization level of at least one of the physical resources by the virtual machine in a next time interval subsequent to the first time interval, and transmitting the one or more commands comprises automatically causing the reconfiguring the virtual machine topology according to the one or more optimizations prior to the next time interval.

* * * * *